(12) United States Patent
Börner

(10) Patent No.: US 6,264,356 B1
(45) Date of Patent: Jul. 24, 2001

(54) BALL WHISK KITCHEN UTENSIL

(75) Inventor: Martin Börner, Kreuzwertheim (DE)

(73) Assignee: WMF AG, Farmingdale, NY (US)

( * ) Notice: Subject to any disclaimer, the term of this patent is extended or adjusted under 35 U.S.C. 154(b) by 0 days.

(21) Appl. No.: 09/542,547

(22) Filed: Apr. 3, 2000

(51) Int. Cl.⁷ .................................................... A47J 43/10
(52) U.S. Cl. ............................................................ 366/129
(58) Field of Search .................................. 366/129, 130, 366/342, 343; 416/69, 70 R, 231 A; 15/141.1, 141.2, 186–188; 99/348; 426/519; D7/376–380, 412, 688, 690

(56) References Cited

U.S. PATENT DOCUMENTS

| | | | |
|---|---|---|---|
| D. 25,394 | * 4/1896 | Upton . | |
| 323,447 | * 8/1885 | Ruebsam . | |
| 427,963 | * 5/1890 | Booz et al. . | |
| D. 431,113 | * 9/2000 | Kwok | D7/690 |
| 671,516 | * 4/1901 | Hegner . | |
| 1,083,808 | * 1/1914 | Dunson . | |
| 1,986,163 | * 1/1935 | Rockwell | 366/129 |
| 2,092,353 | * 9/1937 | Kyseth et al. . | |
| 3,991,983 | * 11/1976 | Drynan . | |
| 4,836,688 | * 6/1989 | Bayly | 366/129 |
| 5,125,751 | * 6/1992 | Coigley | 366/129 |

* cited by examiner

Primary Examiner—Charles E. Cooley
(74) Attorney, Agent, or Firm—Ostrolenk, Faber, Gerb & Soffen, LLP

(57) ABSTRACT

A ball whisk having a handle with a plurality of pins or blades projecting out of an end of the handle in a conical array. The free ends of the blades are provided with enlarged surface area, ball shaped mixing elements. The whisk blades are of resilient metal. The blades are of such length and the balls are so placed that a plane through the balls on the ends of the blades in the conical array is oblique to the axis of the handle.

9 Claims, 2 Drawing Sheets

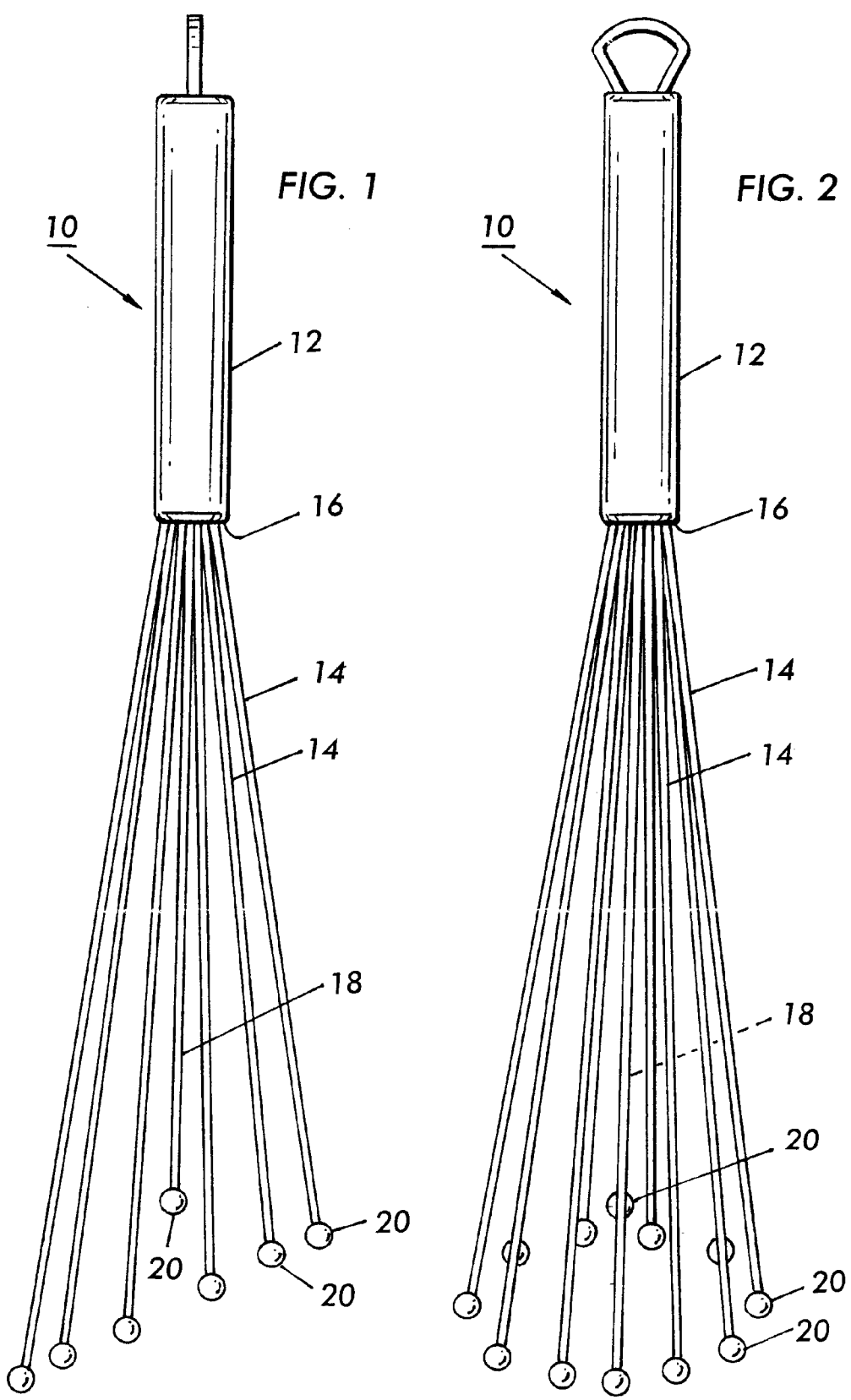

BALL WHISK KITCHEN UTENSIL

BACKGROUND OF THE INVENTION

The present invention relates to a whisk used in mixing food ingredients and particularly relates to a unique structure of the whisk elements.

Most conventional food whisks have a plurality of mixing loops which are shaped to provide effective mixing and agitation of the typically liquid food material through which the loops are moved. The greater is the motion of the whisk elements and the greater is their surface contact with the food during each cycle of movement of the whisk, the more efficient is the whisking action with less effort.

Some whisks are also known that have blades or elongate fingers, rather than loops. See U.S. Pat. 4,836,688, for example. An efficient arrangement of these blades is desirable.

SUMMARY OF THE INVENTION

The object of the invention is to provide a whisk with the ability to maximize the amount of mixing and agitation of the material being whisked. Another object is to increase the surface area of contact between whisk elements and the material being whisked.

According to the present invention, the whisking elements comprise a plurality of elongate blades or pins that project out of a handle toward free ends of the blades.

The ends of the blades carry larger cross-sectional area, e.g. larger size, closed body objects, such as balls as contrasted with the cross-sections of the respective blades; and the balls increase the surface area of contact between the whisk blades and the material being whisked, making mixing more efficient. The balls additionally provide a larger cross-section and larger surface area which prevents possibly destructive damaging contact with sharp tips of blades or pins.

The blades have sufficient flexibility that they yield when the balls at the ends of the blades contact the interior of the bowl or other container in which material is being mixed and sufficient resilience to cause them to return to their undeflected orientations when they do not contact the bowl and when they are not having force applied to them. Their resilience also causes the blades to vibrate slightly as they are moved through the material, increasing the agitation.

The whisk elements, blades or pins project from the handle in a generally conical array which widens toward the free ends of the blades. One or more blades is disposed within the cone array, e.g., along the axis of the whisk and its handle.

The balls at the ends of the generally conically arrayed blades are in a plane which is oblique to the axis of the blade array, so that the whisk in use can be held tilted with respect to the container, with the balls mostly toward the bottom of the container, maximizing the mixing action.

The foregoing and other objects and features of the present invention will become apparent from the following description of a preferred embodiment shown in the accompanying drawings.

BRIEF DESCRIPTION OF THE DRAWINGS

FIG. 1 is a side view of a whisk according to the invention;

FIG. 2 is a view at right angles to FIG. 1;

DESCRIPTION OF A PREFERRED EMBODIMENT

Figure 3:
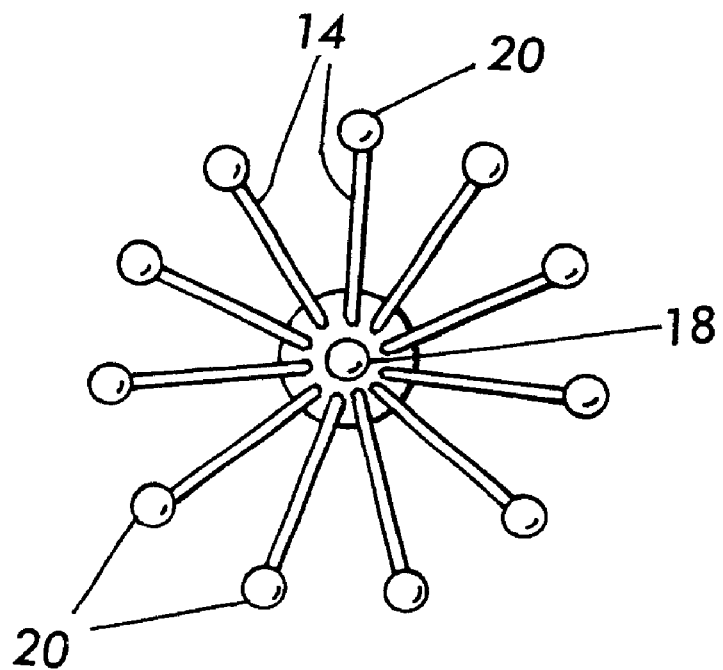
FIG. 3 is a bottom view of the whisk.

The present invention concerns a whisk 10 that is a kitchen utensil used for mixing typically liquid or at least fluid products in a bowl or other container. The whisk includes a graspable handle 12 with a long axis. A plurality of blades or pins 14 project from the bottom 16 of the handle. As seen in the Figures, the blades are fixed non-removably to the handle. As seen particularly in FIG. 3, the blades or pins 14 are in a generally conical array which widens from the bottom of the handle 16 outward to the ends of the blades 14. At least one additional blade 18 is disposed inside the conical array of blades 14 and extends along the axis of the handle 12.

The blades 14, 18 are thin. If their free ends were tips of the same cross-section, they would be sharp and might possibly damage either the user or the bowl or container in which mixing is performed. The ends of all of the blades 14, 18 are provided with enlarged surface area mixing elements 20, of enlarged cross-section relative to the cross-section of the respective blades, the mixing elements being illustrated as having the shape of balls, but not limited to that shape. As seen in FIGS. 1 and 2, the mixing elements 20 are spaced from one another. The enlarged ends of the blades protect against damage that would occur if the blades or pin ends were as thin as the rest of the blades and also provide enlarged surface areas as the whisk is moved through the liquid or fluid material. The increased surface area resulting from the larger cross-section of the balls provides more contact with and mixing of the material, so that the balls 20 enhance the mixing action.

The blades 14, 18 are not rigid, but rather are relatively stiff but resilient, being flexible enough to yield upon force being applied to them laterally, as when they contact the inside of the bowl or container, and resilient to return to their original conical array when force is not being applied to them. The resistance of the liquid or material through which the whisk is moved also tends to slightly bend the blades. The resilience of the blades causes them to try to restore to their original condition. These contrary actions may cause some vibration of the blades during use and that will even further enhance the mixing action.

As a further benefit of the present invention, the conical ball array is rather attractive and unusual, so that the whisk is not only functional.

The blades 14, 18 are not of uniform length. Rather, each blade is of such respective length that a plane may be drawn through the balls 20 at the ends of all of the blades in the conical array and that plane is tilted obliquely to the leg 18 and, therefore, to the longitudinal axis of whisk. When a whisk is held by a user, the user's hand typically inclines the whisk obliquely to the bottom of the bowl. The orientation of the balls at the ends of the blades enables all of the balls to be moved near the bottom of the container or bowl in which the material is being whisked to maximize the mixing action.

The blades and balls may be of metal, such as steel, although the selection of a particular material is a matter of choice, so long as the characteristics noted above are present in the whisk.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A whisk for mixing fluent materials in a container, wherein the whisk comprises:

a handle having an end and having an axis through the end, a plurality of resilient blades, each blade projecting from the handle end, each blade having a fixed end that is attached nonremovably to the handle and a free end away from the handle and each blade having a respective cross-section;

a respective enlarged cross-section, closed body mixing element on the free end of each blade, each element having a larger cross-section than that of the respective blade for increasing the surface area of the blade that contacts the fluent material when the whisk is operated, said mixing elements being spaced from each other to form a gap therebetween.

2. The whisk of claim 1, wherein the mixing elements on the whisk blades are ball shaped.

3. The whisk of claim 1, wherein at least some of the blades project from the handle end in a conical array which widens toward the free ends of the blades.

4. The whisk of claim 3, wherein the mixing elements on the whisk blades are ball shaped.

5. The whisk of claim 3, wherein the whisk blades are comprised of metal and the mixing elements are comprised of metal.

6. The whisk of claim 3, further comprising at least one of the blades being disposed inside the conical array defined by the plurality of blades.

7. A whisk for mixing fluent materials in a container, wherein the whisk comprises:

a handle having an end and having an axis through the end, a plurality of blades projecting from the handle end, each of the blades having a free end away from the handle and each blade having a respective cross-section; at least some of the blades project from the handle end in a conical array which widens toward the free ends of the blades;

a respective enlarged cross-section mixing element on the free end of each of the blades, each element having a larger cross-section than that ofthe respective blade for increasing the surface area of the blade that contacts the fluent material when the whisk is operated;

the mixing elements of the blades are positioned where they generally define a plane and the mixing elements are so placed and the blades arc of such length that the plane defined by the elements is oblique to the axis of the handle, whereby the blades in the conical array are of different respective lengths.

8. The whisk of claim 7, wherein the mixing elements on the blades are ball shaped.

9. A whisk for mixing fluent materials in a container, wherein the whisk comprises:

a handle having an end and having an axis through the end, a plurality of blades projecting from the handle end, each of the blades having a free end away from the handle; at least some of the blades project from the handle end in a conical array which widens toward the free ends of the blades;

the ends of the blades are positioned where they generally define a plane and the blade ends are so placed and the blades are of such length that the plane defined by the blade ends is oblique to the axis of the handle, whereby the blades in the conical array are of different respective lengths.

* * * * *